(12) United States Patent
Scholtes et al.

(10) Patent No.: US 7,950,896 B2
(45) Date of Patent: May 31, 2011

(54) MATERIAL HANDLING APPARATUS

(75) Inventors: William John Scholtes, Greer, SC (US); Matthew A. Job, Taylors, SC (US); Roger T. Johnston, Spartanburg, SC (US); Mark Nunn, Greenville, SC (US)

(73) Assignee: Illinois Tool Works Inc., Glenview, IL (US)

( * ) Notice: Subject to any disclaimer, the term of this patent is extended or adjusted under 35 U.S.C. 154(b) by 260 days.

(21) Appl. No.: 12/040,132

(22) Filed: Feb. 29, 2008

(65) Prior Publication Data
US 2009/0220327 A1 Sep. 3, 2009

(51) Int. Cl.
*B65G 57/22* (2006.01)
*B65G 1/18* (2006.01)
*B65H 29/26* (2006.01)

(52) U.S. Cl. ............... 414/791.6; 414/799; 414/792.8; 414/923; 414/924; 414/794.2

(58) Field of Classification Search ............ 414/791.6, 414/792.6, 792.8, 793.4, 793.5, 793.6, 799
See application file for complete search history.

(56) References Cited

U.S. PATENT DOCUMENTS

| | | | | |
|---|---|---|---|---|
| 2,468,055 A * | 4/1949 | Gibler | .................. | 414/528 |
| 3,180,480 A * | 4/1965 | Preston | .................. | 198/790 |
| 3,471,038 A * | 10/1969 | Verrinder | .................. | 414/793.5 |
| 3,685,636 A * | 8/1972 | Putin | .................. | 198/790 |
| 4,067,456 A | 1/1978 | Schmitt | | |
| 4,239,433 A | 12/1980 | Hanson | | |
| 4,712,975 A | 12/1987 | Salts | | |
| 4,776,741 A * | 10/1988 | Elhaus | .................. | 414/793.5 |
| 2004/0035683 A1* | 2/2004 | Huber | .................. | 198/780 |
| 2006/0182545 A1 | 8/2006 | Ray | | |
| 2006/0269389 A1* | 11/2006 | Bolzani | .................. | 414/799 |
| 2007/0261938 A1 | 11/2007 | Hirasawa et al. | | |

FOREIGN PATENT DOCUMENTS

| AU | 2537171 | 8/1972 |
|---|---|---|
| GB | 2136404 | 9/1984 |
| GB | 2207907 | 2/1989 |

OTHER PUBLICATIONS

International Search Report dated Apr. 24, 2009 for PCT/US2009/034236—5 pages.

* cited by examiner

*Primary Examiner* — Gregory W Adams
(74) *Attorney, Agent, or Firm* — Dority & Manning, P.A.

(57) ABSTRACT

A handling apparatus can be used to transfer objects from a first location to a second location along a defined path, without the need for a conveyor along the path. Instead, the handling apparatus can be moved along the path by a controllable transport device, such as a robot arm. The handling apparatus can comprise a plurality of unpowered rollers which are selectively rotated by way of a transfer assist mechanism during loading and/or unloading of the objects to be transferred. The transfer assist mechanism can comprise a separate component that can power the rollers directly or indirectly. The transfer assist mechanism can comprise a belt which imparts rotational force to the support rollers via contact in some embodiments, with the amount of force controlled by varying the relative inclination of the support rollers and the transfer assist mechanism.

17 Claims, 5 Drawing Sheets

MATERIAL HANDLING APPARATUS

BACKGROUND

Various systems have been proposed for transferring objects in a wide variety of circumstances. For example, one or more objects may be formed into a layer which ultimately will be one of several layers comprising a stack. As a specific example, a pallet of boxes or cartons may comprise several layers, with each layer comprising one or more objects. Conveyors, robots, and other apparatus can be used to arrange objects into layers for subsequent assembly into stacks.

However, some existing approaches to transferring a layer from a first location to another location (such as a stacking location) suffer from deficiencies. For instance, in some implementations, a formed layer is swept or pushed onto a layer handling mechanism from the side. This can, in some circumstances, apply undue stress to products. Nonetheless, a handling mechanism may be needed for certain types of motion that are too complex to be obtained using a conveyor system.

Accordingly, there remains a need for improved layer handling mechanisms.

SUMMARY

In accordance with some aspects of the present subject matter, a handling apparatus can be used to transfer objects from a first location to a second location along a defined path, without the need for a conveyor along the path. Instead, the handling apparatus can be moved along the path by a controllable transport device, such as a robot arm.

The handling apparatus can comprise a plurality of "unpowered" rollers (referred to as "support rollers" herein) which are selectively rotated by way of a transfer assist mechanism during loading and/or unloading of the objects to be transferred. The term "unpowered" when used with the support rollers is meant to refer to how the support rollers are not powered by a source carried on the handling assembly when the support rollers draw objects onto and/or off from the support plane. Instead, the transfer assist mechanism, which powers the rollers directly or indirectly, is a separate component from the handling apparatus.

Accordingly, when the handling apparatus is moved, the transfer assist mechanism is not carried by or with the handling apparatus. Among other advantages, this can simplify the construction and operation of the handling mechanism, since the complexity of a powered handler is avoided without sacrificing careful handling of the objects during transfer into/out of the handler. Furthermore, better control of the loading and/or unloading of the objects can be achieved, since the amount of force applied to incoming and/or outgoing objects can be repeatably controlled by controlling the manner in which the support rollers and transfer assist mechanism are brought into contact.

For instance, a handling apparatus for receiving, lifting and placing objects, can comprise: a material handling assembly carried by a controllable transport device and including a plurality of support rollers which, when in a first position, can receive and support objects at a support plane defined by the material handling assembly. As will be noted below, in some embodiments, the plurality of support rollers can be placed into a second position and/or further positions to facilitate unloading of objects. The support rollers can comprise any suitable material(s) and, in some implementations, comprise carbon composite material. For example, some or all of the support rollers may comprise carbon fiber rods or tubes.

As mentioned above, the handling apparatus can comprise a transfer assist mechanism positioned to rotate at least some of the support rollers when the material handling assembly is positioned proximate the transfer assist mechanism. For example, in some embodiments, the material handling assembly is positioned so that the support rollers are in contact with and directly powered by the transfer assist mechanism. For instance, in some embodiments, the transfer assist mechanism comprises one or more one continuous loops of material. The material engages and drives the support rollers when the support rollers are placed in contact with the material. One example of a transfer assist mechanism is an excitation conveyor which imparts rotational motion to the support rollers to draw one or more objects onto or off from the handling mechanism.

Of course, in other embodiments, the transfer assist mechanism may directly drive the support rollers without the use of a belt or other interface material. In other embodiments, the support rollers are indirectly driven by power supplied from the transfer assist mechanism though suitable power coupling mechanisms included on the handling assembly.

In some embodiments, the transfer assist mechanism may comprise a plurality of cylindrical members engaging a continuous loop of material, with the members engaging a surface of the material opposite the surface of the material which engages the support rollers of the handling assembly. The material handling assembly can be positioned so that the support rollers of the handling assembly are off-tangent relative to the plurality of cylindrical members of the transfer assist mechanism so that some or all of the support rollers deform the continuous loop of material.

The transfer assist mechanism can be arranged so that, when the material handling assembly is positioned for the transfer assist mechanism to drive at least some of the support rollers, some of the driven support rollers deform the continuous loop of material differently from other support rollers. For instance, when the transfer assist mechanism includes one or more loops of material, the mechanism can be arranged so that at least one continuous loop of material extends at an incline relative to the support plane of the material handling assembly. The different degree of deformation can correspond to different amounts of force applied to the support rollers. In fact, some support rollers may not be driven at all.

As was mentioned above, in some embodiments, the support rollers can be selectively positioned in multiple positions. For instance, the support rollers could be positioned between the first position wherein the objects are supported at the support plane and a second position wherein the objects can be released to pass through the support plane. The support plane can be of a generally rectangular shape including two opposite sides extending along a length of the support plane and two opposite ends extending along a width of the support plane. The material handling assembly can include a plurality of tracks attached to the frame and extending along the opposite sides of the support plane, with the ends of the support rollers engaged in the tracks.

In some implementations, at each end of the support plane, each track extends upward from the support plane. The plurality of support rollers can include first and second portions, each portion respectively including support rollers laying on opposite sides of a center line of the material handling assembly. The center line can extend parallel to the ends of the material handling assembly, with an edge of the first and second portions of support rollers meeting adjacent the center line when in the first position and being spaced apart from the center line when in the second position. The material handling assembly can include a drive for moving the support rollers of the first and second portions between the first and second positions. Thus, one or more objects supported in the first position can pass through the support plane under the influence of gravity when the support rollers are moved to the second position.

Of course, other arrangements of support rollers can be used in the handling assembly, and the support rollers may have only a single position in some embodiments.

In some embodiments, the controllable transport device comprises an articulated robot arm capable of moving the material handling assembly between the transfer assist mechanism and a pallet stack location. The robot arm further may be capable of adjusting the amount of force between the transfer assist mechanism and support rollers to thereby control the amount of rotational force applied to the support rollers.

A method of moving one or more objects can comprise: arranging one or more objects into a layer at an assembly location; drawing the layer onto a material handling assembly using a transfer assist mechanism located beneath and in contact with support rollers mounted on the material handling assembly, whereby operation of the transfer assist mechanism applies rotational force directly or indirectly to the support rollers. The method can further include moving the layer to a second location via the material handling assembly, without moving the transfer assist mechanism to the second location; and placing the layer at the second location. The steps may be repeated with additional objects to form a stack at the second location.

In some embodiments, the placing step includes transporting the layer in the material handling assembly to the second location; and moving the plurality of support rollers from a first position, in which the layer is supported, to a second position, in which the layer is released.

In some embodiments, the transfer assist mechanism comprises at least one continuous loop of material having a first surface which contacts the support rollers and a second, opposite, surface which contacts a plurality of cylindrical members of the transfer assist mechanism. The method can comprise, before the drawing step, positioning the material handling apparatus so the support rollers of the handling assembly are off-tangent relative to the cylindrical members of the transfer assist mechanism. This and/or other actions can be used to position the material handling apparatus relative to the transfer assist mechanism so that the amount of rotational force applied to some of the support rollers differs from the amount of rotational force applied to other support rollers.

BRIEF DESCRIPTION OF THE DRAWINGS

A full and enabling disclosure including the best mode of practicing the appended claims and directed to one of ordinary skill in the art is set forth more particularly in the remainder of the specification. The specification makes reference to the appended figures, in which:

Use of like reference numerals in different features is intended to illustrate like or analogous components.

DETAILED DESCRIPTION

Reference will now be made in detail to various and alternative exemplary embodiments and to the accompanying drawings, with like numerals representing substantially identical structural elements. Each example is provided by way of explanation, and not as a limitation. In fact, it will be apparent to those skilled in the art that modifications and variations can be made without departing from the scope or spirit of the disclosure and claims. For instance, features illustrated or described as part of one embodiment may be used on another embodiment to yield a still further embodiment. Thus, it is intended that the present disclosure includes modifications and variations as come within the scope of the appended claims and their equivalents.

Figure 1:
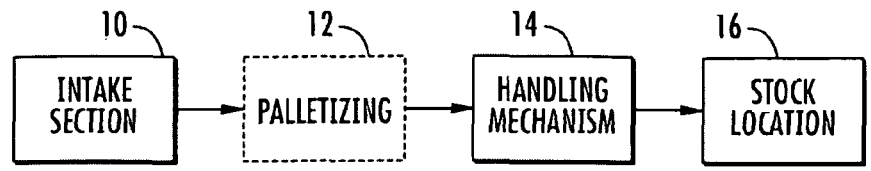
FIG. 1 is a flowchart illustrating exemplary steps in forming a stack of products.

Briefly, FIG. 1 is a flowchart illustrating exemplary steps or stages in a product stacking operation. For instance, the illustrated steps/stages may comprise part of an assembly line, logistics operation, or other environment in which objects are transferred from one location to another. At 10, an intake section receives one or more objects. For example, one or more conveyors may receive output from an assembly line, packing machine, or other suitable source. At 12, a palletizing section is illustrated in phantom. If pallets are being formed from multiple objects, then the objects can be "palletized"—that is, the objects can be arranged to a suitable formation for transfer to a pallet as a single (or multiple) layers. However, stage 12 is shown in phantom since it may not always occur. For instance, if a single object were to be transferred in accordance with the present subject matter, no "palletizing" would necessarily need to occur.

At stage 14, the object(s) are transferred to a handling mechanism. The handling mechanism can be used to move the object(s) to a second location, such as the stacking location associated with stage 16. For example, a layer may be formed at palletizing stage 12. The layer may then enter the handling mechanism, which then moves the layer to stack location 16. If a stack is being formed from multiple layers, the handling mechanism can be positioned to transfer the layer so as to sit atop the previously-transferred layer (or stack base, if any).

Movement of the object(s) to the stack location can often requires multiple types of motion. For example, while a conveyor system may be suitable to provide sufficient motion for the intake section and/or palletizing section, typically a stacking operation will require at least some change in the vertical position of the object(s) as layers are built upon one another. Furthermore, the object(s) may need to be rotated or otherwise follow a (horizontal and/or vertical) path which is not easily followed by a conveyor system.

Some implementations use robot arms to pick up individual objects and assemble layers. If a single robot is used in this manner, layers may be built up slowly; use of multiple robots may allow for faster layer construction, but at the financial and logistical expense of multiple robots.

As was noted above, in some implementations, objects are swept or pushed onto a handling assembly. The handling assembly can then be lifted or otherwise used to move the objects to another location. Applying force to the objects in this manner is not always ideal, though, since the arrangement of the objects can be disrupted and/or the stress from the sweeping operation can harm the objects. Another alternative is for the handling assembly to include powered components which are used to draw the objects onto the handling assembly. However, this introduces complexity and weight to the handling assembly.

Figures 2A, 2B:
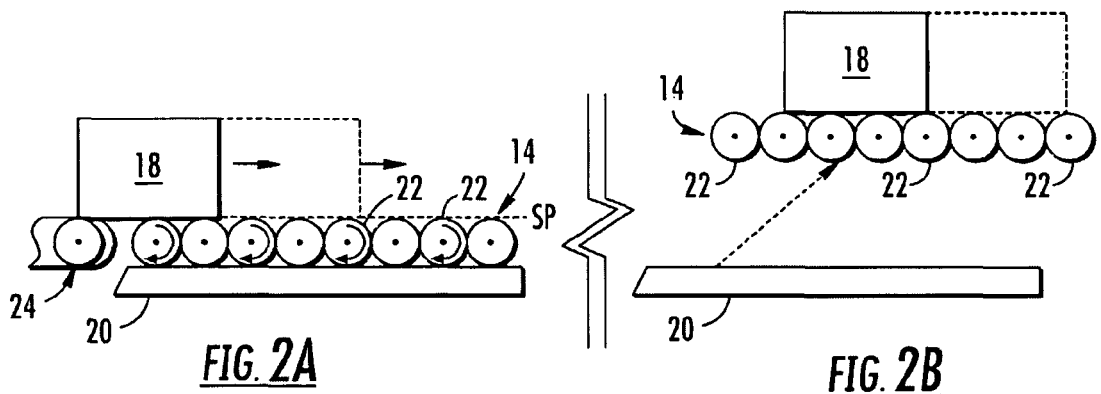
FIG. 2 is a diagram illustrating transfer of an object onto a handling mechanism.

A more desirable alternative for some circumstances is presented in FIG. 2. FIG. 2 is a simplified diagram of a handling assembly 14 which is used to support one or more objects 18 at a support plane SP. In this example, support plane SP is defined by the tops of support rollers 22. In FIG. 2A, object 18 is transferred from another transport system 24 (which may, for instance, be part of an intake stage 10 or palletizing stage 12). For example, transport system 24 may comprise a continuous or linked belt, a set of rollers, etc.

Object 18 is drawn onto rollers 22 of the material handling assembly by rotation of the rollers as indicated by the arrows. Rotational force is imparted by any suitable motion transfer arrangement between the material handling assembly and a transfer assist mechanism 20, the details of which are not shown in FIG. 2. For example, motion may be imparted by direct or indirect contact between at least some of the rollers and one or more parts of transfer assist mechanism 20.

In FIG. 2B, handling assembly 14 continues to support object 18 via rollers 22. However, as indicated by the arrow, handling assembly 14 has been moved away from transfer assist mechanism 20. Handling assembly 14 may be moved vertically, horizontally, or otherwise to take object 18 to another location, without concurrently moving or carrying transfer assist mechanism 20. Accordingly, transfer assist mechanism is "fixed" at its initial location. Additionally or alternatively, transfer assist mechanism 20 could be moved from the position of FIG. 2A to the position of FIG. 2B.

Thus, handling assembly 14 has the advantages of a powered set of rollers without the attendant weight or complexity which would be involved if such rollers were powered by a mechanism carried by handling assembly 14. An additional transfer assist mechanism 20 could be positioned at the final location for object 18 to aid in off-loading the object. However, as will be noted in detail later below, in some embodiments, handling assembly 14 can be configured to off-load objects without the need to impart rotation to rollers 22.

Figure 3:
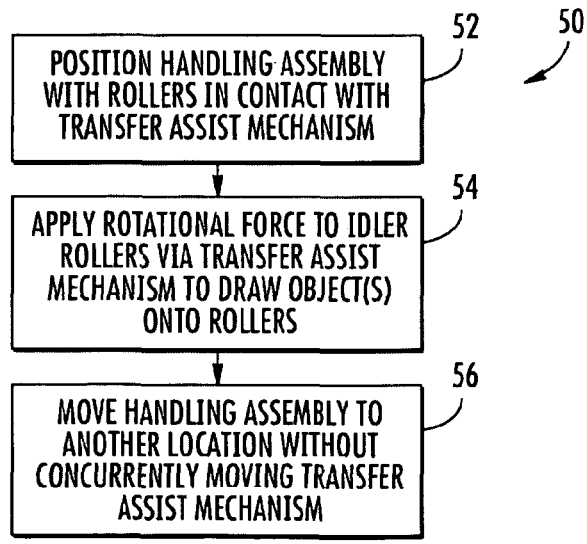
FIG. 3 is a flowchart illustrating steps in an exemplary method of transferring an object.

FIG. 3 is a flowchart showing steps in an exemplary method 50 for transferring an object. At step 52, the handling assembly is positioned with rollers in contact with a transfer assist mechanism. Then, at 54, rotational force is applied to the support rollers of the handling assembly via the transfer assist mechanism. This force draws one or more objects onto (or from) the rollers. Then, at 56, the handling assembly is moved to another location without concurrently moving the transfer assist mechanism to the other location using the handling assembly. Conceivably, the transfer assist mechanism itself could be moved at the same time, but independently from, the handling assembly, for use at another location.

In some embodiments, the handling assembly can be configured to vertically drop objects at the second location. For instance, the handling assembly can be positioned over the second location so that one or more objects (such as a plurality of objects arranged into a layer) can be stacked at the second location.

Figure 4:
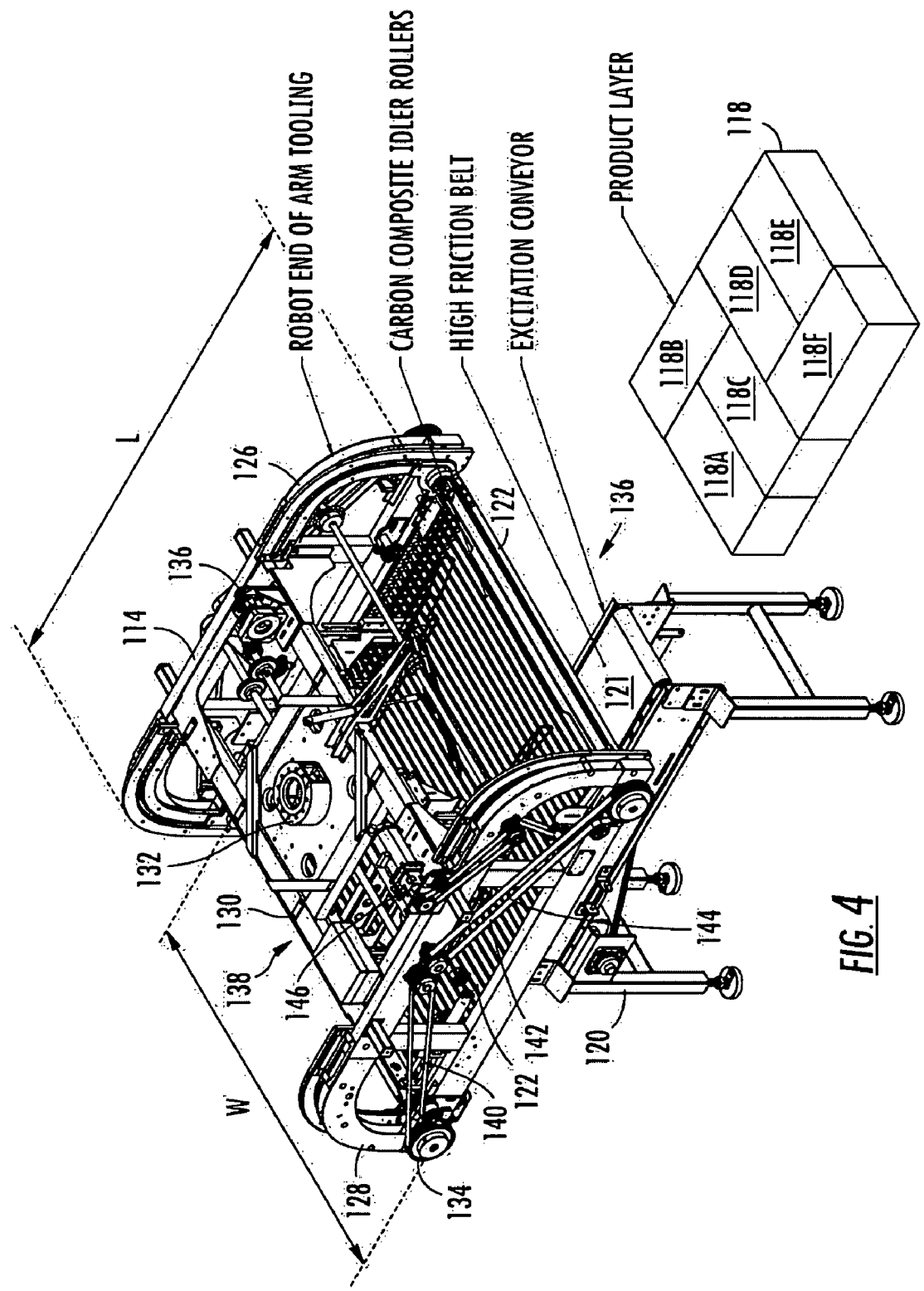
FIG. 4 is a diagram showing a partial perspective view of an exemplary handing apparatus and transfer assist mechanism.

FIG. 4 is a partial perspective view of an exemplary handling assembly 114 suitable for use in accordance with at least some aspects of the present subject matter. As illustrated, handling assembly 114 can receive objects at a first location and then "drop" the objects at a second location. FIG. 4 further illustrates a transfer assist mechanism 120 and a plurality of objects 118A, 118B, 118C, 118D, 118E, 118F arranged into a layer (collectively referred to as "objects 118").

FIGS. 5A, 5B, and 5C are each an illustration of some aspects of handling assembly 114 as viewed from one side. Namely, FIG. 5A shows a handling assembly 114 with support rollers 122 being driven by transfer assist mechanism 120 to draw objects 118 onto support rollers 122. FIG. 5B shows handling assembly 114 supporting objects 118 at support plane SP while handling assembly is moved to another location. FIG. 5C shows handling assembly 114 in an unloading position with support rollers 122 moved to allow objects 118 to pass through support plane SP for deposit at stack location 119, which comprises a pallet of objects in this example.

Handling assembly 114 includes a frame 130 which includes or is attached to two tracks 126 and 128. Each track extends along a length L of the handling assembly. The tracks are spaced apart so as to define a width W of the handling assembly. The ends of a plurality of support rollers 122 are engaged in the tracks. That is to say, the support rollers may comprise a main cylindrical body with protrusions at each end of the cylinder, with the protrusions configured to engage in the tracks. In some embodiments, the support rollers are mounted on chains on each side of the handling assembly. The chains are driven by a motive mechanism mounted on the handling device. While mounted on the chains the rollers act as free rolling mechanisms that freely roll when brought in contact with the transfer assist mechanism. In other embodiments, the support rollers may comprise rods or tubes which engage directly into the tracks.

The handing assembly 114 defines a support plane along the tops of support rollers 122. The support plane in this example is generally rectangular and is approximately equal in length and width to length L and width W of the handling assembly. When support rollers 122 are in the first position, the support plane (shown as SP in FIG. 5) is tangent to the tops of the rollers. It will be understood that in practice, and depending upon the object(s) supported by the rollers, the object(s) may slightly sag or droop a bit onto the rollers, but not so much as to substantially interfere with moving objects across the rollers.

The frame of the handling assembly defines a height H measured from the support plane. The height can be varied according to any suitable design parameters, and should generally be high enough so that objects moving into or out of ends 136 and/or 138 have sufficient clearance.

In this example, handling assembly 114 includes a motive mechanism, such as motors 136, 146 and a series of pulleys (e.g. 134) and belts 140, 142, 144, which can be used to change the position of support rollers. Namely, the belts, drives and other components can be used to move the support rollers along tracks 126/128 between a first position, in which objects can be supported at the support plane, and a second position. In the second position, support rollers 122 are moved out of the support plane so that objects can pass downward through the support plane under the influence of gravity.

For example, the drive components may be linked to one or more rollers which urge the other rollers along the tracks when the rollers are moved from the first to the second position. Alternatively, all of the support rollers may be linked by suitable components and pulled or pushed along the tracks between the first and second positions. For instance, as noted above, the rollers may be mounted on chains that are moved via pulleys and belts.

Figure 5:
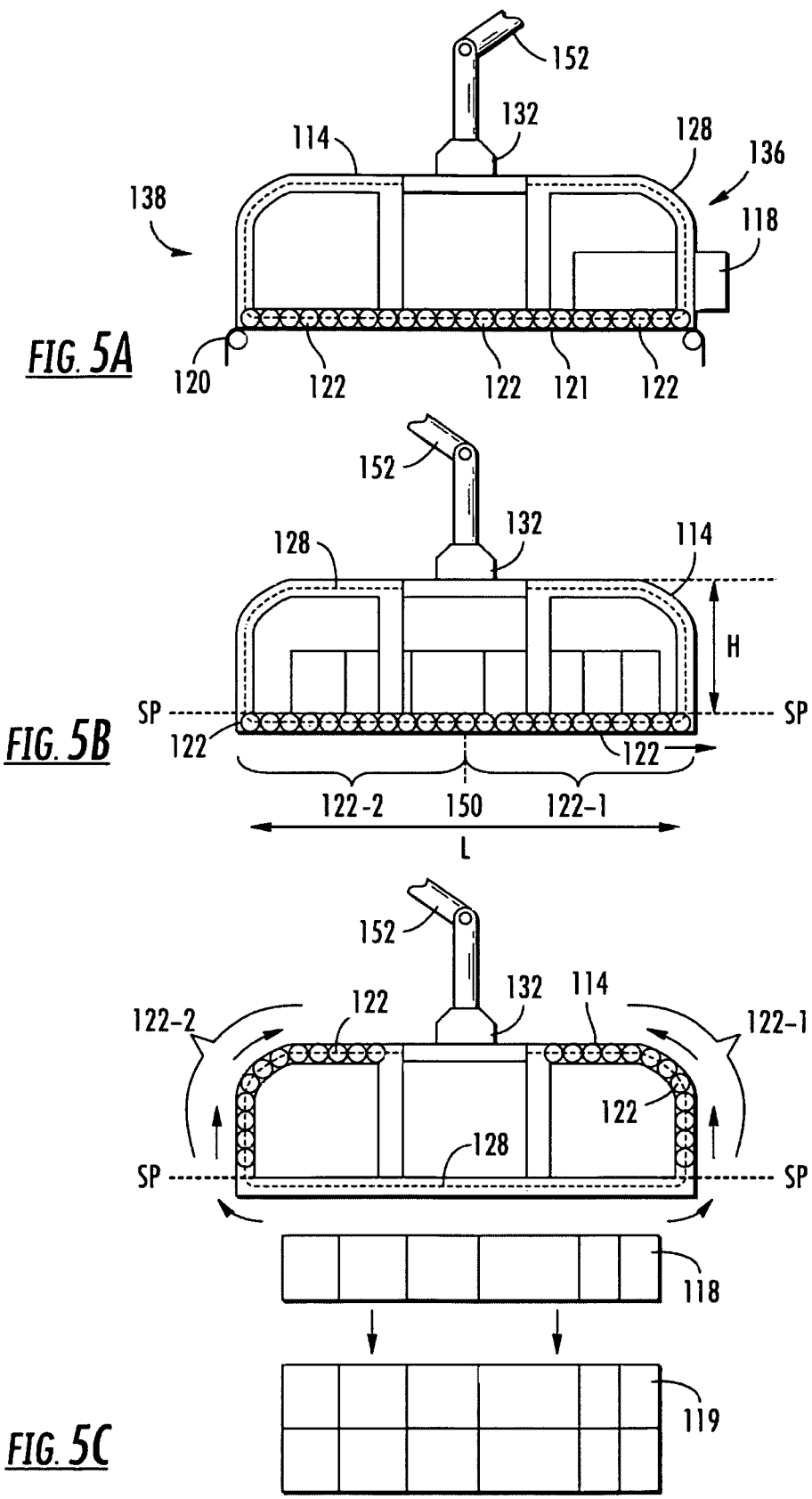
FIGS. 5A, 5B, and 5C depict aspects of the handling apparatus of FIG. 4 from one side.

As shown in FIG. 4 and FIGS. 5A, 5B, and 5C, at each end of the support plane, each track 126/128 extends upward from the support plane (only track 128 is visible in the side views of FIG. 5, and is shown as a dashed line). The plurality of support rollers can include first and second portions 122-1 and 122-2, respectively, with each portion respectively including support rollers laying on opposite sides of a center line 150 of the length L of the material handling assembly.

For instance, an edge of the first and second portions of support rollers can meet adjacent the center line (at or near about 0.5 L as measured from either end) when in the first position, as best seen in FIG. 5B. Drive components (e.g. motors 136/146, belts and pulleys 134, 140, 142, 144) can be used to move the rollers out of the first position and into the second position by urging the rollers to move along tracks 126 and 128. Portions 122-1 and 122-2 are visible in the second position in FIG. 5C. I The drive components used to vary the position of support rollers 122 are not used to apply rotational force to the rollers for moving objects onto or off from the rollers. It should be appreciated that, in some embodiments, the rollers may rotate some when moving between the first and second positions.

When in the first position (i.e. to draw objects onto and/or off from the support plane), the rollers can be placed in (direct or indirect) contact with and powered via transfer assist mechanism 120 (and not powered via motors 136/146 and related positioning components). In different embodiments, some or all of the rollers are driven by transfer assist mechanism 120.

In this example, support rollers 122 freely rotate; that is, each individual roller 122 rotates independently of the rotation of the other support rollers 122. However, in other embodiments, a mechanism could be used to link the motion of one or more support rollers 122 together. For example, a gear train could be used to link the motion of one or more support rollers 122. Accordingly, one or more support rollers 122 could be driven to thereby also drive other rollers.

In several examples herein, support rollers 122 are driven by contact with one or more belts driven by components of the transfer assist mechanism. However, in other embodiments, no belt is used. Instead, powered rollers of the transfer assist mechanism could be configured to contact support rollers 122 of the handling assembly. Still further, in other embodiments, powered rollers of the transfer assist mechanism could contact other components of the handling assembly that are mechanically linked to support rollers 122 to thereby indirectly drive support rollers 122 without contacting support rollers 122.

Note that, in other embodiments, transfer assist mechanism 120 does not need to comprise a conveyor belt or rollers. Further, such an alternative transfer assist mechanism also can impart motion to support rollers 122 without contact between the transfer assist mechanism 120 or any of the rollers. For example, handling assembly 114 may carry a mechanism whereby one or more of support rollers 122 can be driven to rotate. However, the mechanism may be not be powered by any components carried on or comprising the handling assembly. Instead, one or more power input couplings can be configured to interface with one or more respective couplings on a transfer assist mechanism when the handling assembly is positioned proximate the transfer assist mechanism. Accordingly, power can be provided to rotate support rollers 122 when handling assembly is positioned proximate to the transfer assist mechanism, with support rollers 122 being unpowered when handling assembly is moved away from the transfer assist mechanism.

Handling assembly 114 further includes a connection point 132 where the handling assembly may be attached to any suitable controllable transport device. For instance, in some embodiments, handling assembly 114 may be attached to an articulated robot arm 152 (shown in FIGS. 5A, 5B, and 5C) which can be used to move handling assembly 114 in multiple directions.

Although in this example handling assembly 114 is connected to and moved by an articulated robot arm 152, in other embodiments, any suitable controllable transport device may be used. For example, handling assembly 114 may be connected to one or more members which move along an overhead track or chain. As another example, handling assembly 114 could be connected to one or more cables and hoisted to different locations.

Regardless of the type of controllable transport device, handling assembly can be initially placed with support rollers 122 in contact with a transfer assist mechanism, such as an excitation conveyor. Objects such as 118 can be drawn onto the conveyor. Then, the controllable transport device can be commanded to move handling assembly proximate to a second location for objects 118. For instance, the loaded handling assembly can be positioned over a pallet or a previously-stacked layer. Then, objects 118 can be released onto the layer or pallet such as is shown in FIG. 5C, with the motion of portions 122-1 and 122-2 of support rollers 122 indicated by the arrows.

Of course, in other embodiments, another transfer assist mechanism could be used at the second location to drive the support rollers so as to draw the objects from the handling assembly to the second location.

Figure 6:
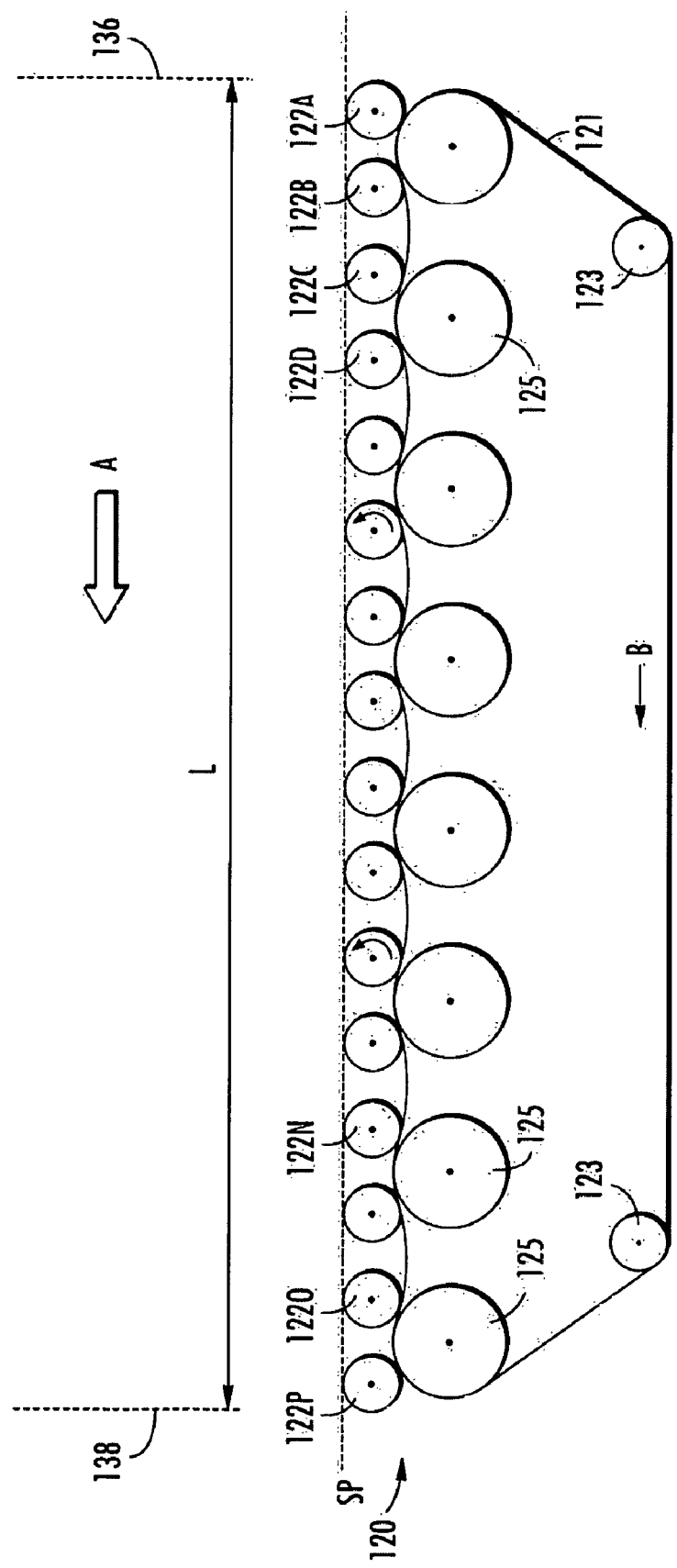
FIG. 6 is a diagram showing a partial view of an exemplary handling apparatus and transfer assist mechanism in contact with one another.
Figure 7:
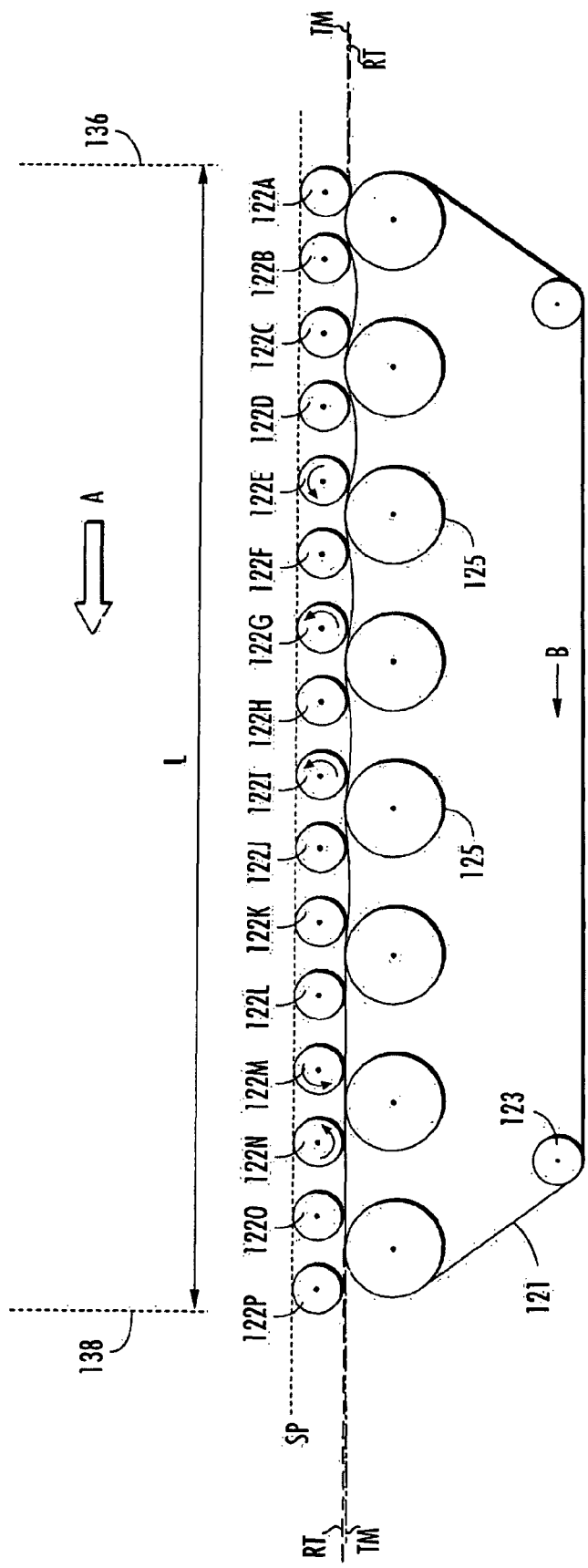
FIG. 7 is a diagram showing a partial view of an exemplary handling apparatus and transfer assist mechanism in contact with one another so as to provide variable amounts of motion transfer.

Turning now to FIGS. 6 and 7, some aspects of the driving process will be discussed in closer detail. Both FIGS. 6 and 7 are cross-sectional views of portions of a handling assembly and transfer assist mechanism when support rollers 122 of the handling assembly are driven by the transfer assist mechanism. In both examples, support rollers 122 and support plane SP extend along the length L of the handling assembly. Individual support rollers are identified as 122A, 112B, 122C, and so on until 122P. In this example, the transfer assist mechanism comprises one or more endless loops of material 121, such as a conveyor or other belt. Belt 121 is driven by a drive motor or other suitable source of motive power transferred by one or more of rollers 125 and/or 123.

Drive/idler rollers 123, 125 are intended to represent any suitable cylindrical component for use in engaging support rollers 122 to impart rotational force. The term "drive/idler rollers" is used to distinguish rollers 123, 125, which are components of the transfer assist mechanism, from support rollers 122 which are part of the handling assembly. Some or all drive/idler rollers 123, 125 may be driven in ay suitable way, such as by a belt drive included as part of the transfer assist mechanism, etc.

In some embodiments, drive/idler rollers 123, 125 can extend along the width of a conveyor belt (i.e. in a direction perpendicular to the page in FIGS. 5 and 6). In other embodiments, driver/idler rollers 123, 125 are shorter, yet sufficiently wide to accommodate a drive belt. As another example, multiple narrow belts could be used, with the belts spaced apart across the width of the transfer assist mechanism.

In this example, belt 121 is driven in direction B. This, in turn causes support rollers 122 to rotate as shown in FIGS. 6 & 7. Objects in contact with one or more support rollers 122 are accordingly drawn in direction A, which in this example points from end 136 to end 138. Of course, by reversing the direction in which belt 121 moves, support rollers 122 can be moved in the opposite direction. Thus, one or more objects placed at end 136 could be drawn onto support plane SP and/or one or more objects already supported at SP could be drawn off from support plane SP towards end 138.

In FIG. 6, support rollers 122 are aligned relative to the cylindrical members 125 so that support rollers 122 can be positioned below a plane tangent to the top surface of each of the cylindrical members 125 of the transfer assist mechanism. Since, in this example, the transfer assist mechanism comprises a belt 121, the belt is therefore deformed by support rollers 122. Put another way, the support rollers 122 are off-tangent relative to the cylindrical members 125 so that rollers 122 are "couched" between cylindrical members 125 and therefore deform belt 121. It will be understood, of course, that the relative arrangement of support rollers 122 and cylindrical members 125 could differ from this example.

The amount of deformation will depend upon factors such as the amount of compressive force between support rollers 122 and belt 121, which can increase the coupling between belt 121 and 122. Thus, the amount of rotational force can be controlled via controlling belt deformation and/or the amount of friction between the belt and the support rollers.

For instance, if the handling mechanism is attached to an end of a robot arm, then the amount of downward pressure can be adjusted through appropriate configuration of the robot arm. As another example, downward pressure may be adjusted by inclusion of suitable components on the frame of the handling assembly and/or upward force may be applied through configuration of the transfer assist mechanism.

If an appropriately-configured robot arm (or other controllable transport device) is used, then the arrangement of support rollers and a transfer assist mechanism can lead to repeatable, more precisely controlled handling of objects since the amount of force can be more finely controlled.

An additional aspect of controlling the amount of rotational force will now be discussed in conjunction with FIG. 7. As mentioned above, FIG. 7 is a cross-sectional view of portions of a handling assembly and transfer assist mechanism. However, in contrast to FIG. 6, in this example, the transfer assist mechanism and support rollers 122 are positioned at an angle to one another. By positioning the support rollers 122 of the material handling apparatus relative to the transfer assist mechanism in this manner, the amount of rotational force applied to some of support rollers 122 will differ from the amount of rotational force applied to other support rollers 122. Also, a varying degree of slipping between support rollers 122 and belt 121 may occur.

The relative angle can be seen in FIG. 7 by reference to the dashed line RT, which is tangent to the bottom surface of the support rollers 122, and the line TM, which is tangent to the top surface of each cylindrical member 125. Lines RT and TM are not parallel to one another. Although the difference is slight in this example, it will be understood that a larger relative inclination could be used.

Either or both the handling apparatus and the transfer assist mechanism can be positioned at a suitable inclination to achieve the variable drive effect. For example, if belt 121 and cylindrical members 123 and 125 comprise a belt and rollers of an excitation conveyor, then the excitation conveyor can be positioned at an incline. In this example, the incline is such that more rotational force is applied to support rollers near end 136 than those rollers near end 138. For instance, support rollers 122A, 122B, and 122C deform belt 121 much more than rollers near end 138 and therefore may be driven more strongly. On the other hand, support rollers such as 122O and 122P, which do not deform belt 121 as much, may driven with much less force or may not be driven at all.

Such variable drive can be useful in different circumstances. For example, strong drive at one end of the handling apparatus can be used to overcome the initial momentum of stationary objects which are in contact with only one or two support rollers near an end of the handling apparatus in order to draw those objects onto the remaining support rollers. By decreasing the amount of force applied as the objects move onboard, the risk that the object(s) could be accelerated out the other end of the handling apparatus can be reduced.

Another aspect which may allow for better control of objects on the support rollers is braking by way of the transfer assist mechanism. For example, if load adjustment is needed, the transfer assist mechanism can be used to reduce rotational force applied to the support rollers or to apply force in the opposite direction while one or more objects are on the support rollers. In other embodiments, suitable braking mechanisms could be included on handling assembly 114 to stop or reduce the motion of support rollers 122.

In the examples above, support rollers 122 of the handling assembly were depicted as having the same diameter. However, in other embodiments, at least some support rollers 122 may have differing diameters from other support rollers 122.

The above examples refer to a "support plane." However, the support rollers may be arranged and configured so that a non-planar surface is defined by the rollers and/or other components that support the objects.

Any suitable material can be used to construct the support rollers. However, in some embodiments, the use of carbon composite materials, such as carbon fiber tubes, may advantageously reduce or avoid sagging of the rollers near the midpoint of the width of the support plane. Similarly, any suitable materials can be used to construct the frame and transfer assist mechanism. In some embodiments, the transfer assist mechanism comprises an excitation conveyor using a high-friction belt.

The particular drive systems used in conjunction with the present subject matter will vary according to particular implementations. For instance, the transfer assist mechanism and/or handling apparatus may be moved/driven by electrical, hydraulic, or any other suitable systems.

It is appreciated by persons skilled in the art that what has been particularly shown and described above is not meant to be limiting, but instead serves to show and teach various exemplary implementations of the present subject matter. As set forth in the attached claims, the scope of the present invention includes both combinations and sub-combinations of various features discussed herein, along with such variations and modifications as would occur to a person of skill in the art.

What is claimed:

1. A handling apparatus for receiving, lifting and placing objects, the handling apparatus comprising:
   a controllable transport device movable between a loading position and an unloading position, the controllable transport device including an articulated robot arm;
   a material handling assembly carried by the controllable transport device, the material handling assembly including a plurality of support rollers which, when in a first position, can receive and support objects at a support plane defined by the material handling assembly, the support rollers being selectively positionable between the first position wherein the objects are supported at the support plane and a second position wherein the objects can be released to pass through the support plane, the support plane being of a generally rectangular shape including two opposite sides extending along a length of the support plane and two opposite ends extending along a width of the support plane, the plurality of support rollers including first and second portions, each portion respectively including support rollers laying on opposite sides of a center line of the material handling assembly, the center line extending parallel to the ends of the material handling assembly, an edge of the first and second portions of support rollers meeting adjacent the center line when in the first position and being spaced apart from the center line when in the second position, the material handling assembly including a drive for moving the support rollers of the first and second portions between the first and second positions; and a transfer assist mechanism including an excitation conveyor fixed at the loading position having a continuous loop drivable so as to rotate at least some of the support rollers when the controllable transport device is in the loading position, to thereby draw objects onto or off from the material handling assembly at the support plane, the articulated robot arm capable of moving the material handling assembly between the transfer assist mechanism where the support rollers contact the continuous loop and a pallet stack location.

2. The handling apparatus set forth in claim 1, wherein:
the material handling assembly includes a plurality of tracks attached to the frame and extending along the opposite sides of the support plane; and
ends of the support rollers are engaged in the tracks.

3. The handling apparatus set forth in claim 2, wherein, at each end of the support plane, each track extends upward from the support plane.

4. The handling apparatus set forth in claim 1, wherein at least some of the support rollers comprise a carbon composite material.

5. The handling apparatus set forth in claim 1, wherein the transfer assist mechanism is arranged so that, when the material handling assembly is positioned for the transfer assist mechanism to drive at least some of the support rollers, at least some of the driven support rollers deform the continuous loop.

6. The handling apparatus set forth in claim 5, wherein the transfer assist mechanism is arranged so that at least one continuous loop extends at an incline relative to the support plane of the material handling assembly.

7. The handling apparatus set forth in claim 1, wherein:
the transfer assist mechanism comprises a plurality of cylindrical members engaging the continuous loop of material on a surface opposite a surface of the material which engages the support rollers; and
the material handling assembly is positioned so that the support rollers are off-tangent relative to the plurality of cylindrical members of the transfer assist mechanism.

8. A handling apparatus attachable to a controllable transfer device, for receiving, lifting and placing objects, the handling apparatus comprising:
a material handling assembly configured for attachment to a controllable transfer device and defining a support plane, the material handling assembly including a frame and a plurality of support rollers, the support rollers being orientable so as to receive and to support objects at the support plane, the support rollers being selectively positionable between a first position wherein the objects are supported at the support plane and a second position wherein the objects can be released to pass through the support plane, the support plane being of a generally rectangular shape including two opposite sides extending along a length of the support plane and two opposite ends extending along a width of the support plane, the plurality of support rollers including first and second portions, each portion respectively including rollers laying on opposite sides of a center line of the material handling assembly, the center line extending parallel to the ends of the material handling assembly, an edge of the first and second portions of support rollers meeting adjacent the center line when in the first position and being spaced apart from the center line when in the second position, the material handling assembly including a drive for moving the support rollers of the first and second portions between the first and second positions; and an excitation conveyor including a drivable continuous loop, the material handling assembly being positionable over the excitation conveyor via the controllable transfer device to provide contact between the continuous loop and at least some of the support rollers, whereby operation of the continuous loop rotates the contacted support rollers so as to draw objects onto or off from the material handling assembly.

9. The handling apparatus set forth in claim 8, wherein:
the material handling assembly includes a plurality of tracks attached to the frame and extending along the opposite sides of the support plane; and
ends of the support rollers are engaged in the tracks.

10. The handling apparatus set forth in claim 9, wherein, at each end of the support plane, each track extends upward from the support plane.

11. The handling apparatus set forth in claim 8, wherein at least some of the support rollers comprise a carbon composite material.

12. The handling apparatus set forth in claim 8, wherein the transfer assist mechanism is arranged so that, when the material handling assembly is positioned for the transfer assist mechanism to drive at least some of the support rollers, at least some of the driven support rollers deform the continuous loop.

13. The handling apparatus set forth in claim 8, wherein the excitation conveyor is positioned so that the top of the continuous loop extends at an incline relative to the support plane of the material handling assembly.

14. A method of moving one or more objects to a pallet stack location, the method comprising:
(a) arranging one or more objects into a layer at an assembly location;
(b) drawing the layer onto a material handling assembly using a transfer assist mechanism located beneath and in contact with support rollers mounted on the material handling assembly, a frame and a plurality of support rollers, the support rollers being orientable so as to receive and to support objects at the support plane, the support rollers being selectively positionable between a first position wherein the objects are supported at the support plane and a second position wherein the objects can be released to pass through the support plane, the support plane being of a generally rectangular shape including two opposite sides extending along a length of the support plane and two opposite ends extending along a width of the support plane, the plurality of support rollers including first and second portions, each portion respectively including rollers laying on opposite sides of a center line of the material handling assembly, the center line extending parallel to the ends of the material handling assembly, an edge of the first and second portions of support rollers meeting adjacent the center line when in the first position and being spaced apart from the center line when in the second position, the material handling assembly including a drive for moving the support rollers of the first and second portions between the first and second positions, the material handling assembly being positioned so the support rollers are off-tangent relative to cylindrical members of the transfer assist mechanism, whereby operation of the transfer assist mechanism applies rotational force to the support rollers, the transfer assist mechanism including at least one drivable continuous loop having a first surface which contacts the support rollers and a second, opposite, surface which contacts the cylindrical members of the transfer assist mechanism;

(c) moving the layer to a second location via a controllable transport device including an articulated robot arm attached to the material handling assembly, without moving the transfer assist mechanism to the second location; and (d) placing the layer at the second location, the second location comprising the pallet stack location.

15. The method set forth in claim 14, further comprising:
repeating steps (a) to (d) at least one time with additional objects to achieve a stack of at least two layers at the second location.

16. The method set forth in claim 14, wherein the placing step includes:
transporting the layer in the material handling assembly to the second location; and
moving the plurality of support rollers from a first position, in which the layer is supported, to a second position, in which the layer is released.

17. The method set forth in claim 14, wherein the method further comprises:
before the drawing step, positioning the material handling apparatus relative to the transfer assist mechanism so that the amount of rotational force applied to some of the support rollers differs from the amount of rotational force applied to other support rollers.

* * * * *